United States Patent
Klein et al.

(10) Patent No.: US 9,684,553 B2
(45) Date of Patent: Jun. 20, 2017

(54) GENERATION OF INSTRUCTIONS FOR REPAIRING AN ELECTROMECHANICAL SYSTEM

(71) Applicants: Jan Patrick Klein, Mannheim (DE); Markus Seidl, Weyarn (DE)

(72) Inventors: Jan Patrick Klein, Mannheim (DE); Markus Seidl, Weyarn (DE)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 14/529,165

(22) Filed: Oct. 31, 2014

(65) Prior Publication Data

US 2016/0124821 A1   May 5, 2016

(51) Int. Cl.
*G06F 11/00* (2006.01)
*G06F 11/07* (2006.01)
*G06F 17/40* (2006.01)

(52) U.S. Cl.
CPC ...... *G06F 11/0766* (2013.01); *G06F 11/0739* (2013.01); *G06F 17/40* (2013.01)

(58) Field of Classification Search
CPC ............. G06F 11/2097; G06F 11/2007; G06F 11/079; G06F 11/2257; G06F 11/0709;
(Continued)

(56) References Cited

U.S. PATENT DOCUMENTS 8,525,657 B2 *  9/2013  Patel ................... B60C 23/0401
                                              340/438
8,648,700 B2 *  2/2014  Gilbert ................ B60R 16/0234
                                              340/425.5
(Continued)

FOREIGN PATENT DOCUMENTS

WO     WO 00/60465     10/2000

*Primary Examiner* — Yair Leibovich
(74) *Attorney, Agent, or Firm* — Richardt Patentanwalte PartG MbH

(57) ABSTRACT

The invention provides for an electromechanical system comprising a machine. The machine comprises at least one mechanical component and at least one electrical sensor for acquiring measurement data. The system further comprises a data logger computer system for logging the measurement data and error reports as historical data, wherein the error reports are descriptive of one or more failure modes of the at least one mechanical component, wherein the error reports are further descriptive of repair actions taken to repair the one or more failure modes. The system further comprises a machine monitor comprising a repair solution engine, wherein the machine monitor comprises a memory containing processor instructions that implement the repair solution engine, wherein the machine monitor comprises a processor for executing the processor instructions. The system further comprises a data transfer system for transferring the data from the machine to the machine monitor. The system further comprises a client computer system. Execution of the processor instructions cause the processor to: receive the measurement data from the data transfer system; receive the historical data from the data logger computer system; search the historical data to determine a current failure mode and a selected repair action, wherein the current failure mode is selected from the one or more failure modes of the historical data, wherein the selected repair action is selected from the repair actions; generate repair instructions using the selected repair action; and transfer the repair instructions of the selected repair entry to the client computer system.

17 Claims, 7 Drawing Sheets

(58) Field of Classification Search
CPC ............. G06F 11/0793; G06F 11/0766; G06F 11/0739; G06F 17/40
USPC .......................................................... 714/26
See application file for complete search history.

(56) References Cited

U.S. PATENT DOCUMENTS

| | | |
|---|---|---|
| 9,262,254 B2* | 2/2016 | Bertosa .................... H04L 67/12 |
| 2002/0007237 A1* | 1/2002 | Phung ................. G05B 23/0216 |
| | | 701/31.4 |
| 2009/0006319 A1* | 1/2009 | Lehtipalo .......... G06F 17/30572 |
| 2009/0006476 A1* | 1/2009 | Andreasen ............. G06Q 50/30 |
| 2010/0190439 A1* | 7/2010 | Huang .................... H04L 69/03 |
| | | 455/41.2 |
| 2013/0304306 A1* | 11/2013 | Selkirk ................... G07C 5/008 |
| | | 701/31.4 |
| 2017/0009297 A1* | 1/2017 | Spencer ............... C12Q 1/6883 |

* cited by examiner

GENERATION OF INSTRUCTIONS FOR REPAIRING AN ELECTROMECHANICAL SYSTEM

BACKGROUND OF THE DISCLOSURE

Field of the Disclosure

The invention relates to electromechanical system, in particular for the generation of instructions for repairing electromechanical systems.

Description of the Related Art

For maintaining complex systems such as aircraft or factories, information system may be used to track maintenance schedules and keep records of actual maintenance that has been performed. Systems also exist which can keep a database of solutions for solving repair problems. These systems are however of limited use, because they demand such a high amount of manual maintenance that they are not typically used.

SUMMARY OF THE PRESENT DISCLOSURE

The invention provides for an electromechanical system, a machine monitor and a method of repairing the electromechanical system in the independent claims. Embodiments are given in the dependent claims.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors.

The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

In one aspect the invention provides for an electromechanical system comprising a machine. The machine comprises at least one mechanical component. The machine further comprises at least one electrical sensor for acquiring measurement data descriptive of the at least one mechanical component. The electromechanical system further comprises a data logger for logging the measurement data and error reports as historical data. The data logger may be a data logger computer system. The error reports are descriptive of one or more failure modes of the at least one mechanical component. The error reports are further descriptive of repair actions taken to repair the one or more failure modes. The electromechanical system further comprises a machine monitor comprising a repair solution engine. The machine monitor comprises a memory containing processor instructions that implement the repair solution engine. The machine monitor comprises a processor for executing the processor instructions. The electromechanical system further comprises a data transfer system for transferring the data from the machine to the machine monitor.

In some examples the data transfer system or a separate aggregator aggregates the measurement data. For example if a sensor is continuously acquiring sensor measurements which is the measurement data this may cause an increasingly large amount of data to be generated. A data aggregator could for instance take an average or statistical property of the measurement data for a particular period of time. This may reduce the amount of data that needs to be stored.

The electromechanical system further comprises a client system or a client computer system. In some examples the client system has a user interface and when the machine is repaired a user may enter error reports or other historical data into the client system. This may wind up being stored by the data logger.

Execution of the processor instructions causes the processor to receive the measurement data from the data transfer system. Execution of the processor instructions causes the processor to receive the historical data from the data logger. In some examples the historical data may be in the form of a database such as a relational database. The step of receiving the historical data from the data logger may then be stored the database.

Execution of the processor instructions further causes the processor to search the historical data to determine a current failure mode and a selected repair action. The current failure mode is selected from the one or more failure modes of the historical data. The selected repair action is selected from the repair actions. The step of searching historical data may be repeated periodically. For instance the searching of the historical data to determine a current failure mode may be used to preempt a failure by the at least one mechanical component.

Execution of the processor instructions further cause the processor to generate repair instructions using the selected repair action. In some examples the repair action may continue detailed instructions. In other examples a text processing tool may be used to automatically generate the repair instructions. Execution of the processor instructions further cause the processor to transfer the repair instructions at the selected repair entry to the client system.

In another embodiment the client system comprises a display.

In another embodiment after transferring the repair instructions of the selected repair entry to the client system the repair instructions may be displayed on the display.

In another embodiment the data logger is configured for at least partially collecting the error reports using a text mining module and one or more documents. For example journal articles or newspaper articles or other technical data, which describes the machine may be scoured by text mining module to locate and store error reports. This embodiment may be beneficial because error reports can be generated without the actual failure of the machine.

In another embodiment the client system further comprises a user interface. The data logger is further configured for receiving the error reports at least partially from the user interface of the client system.

In another embodiment the client system is further configured for receiving historical data from the data logger. The client system is further configured for displaying historical data on the display. The client system is further configured for receiving the error report from the user interface in response to displaying the historical data. In this embodiment the user of the client system may retrieve data and identify historical data and then have it saved for further use by the electromechanical system.

In another embodiment the historical data is displayed as a parallel coordinate plot. There may for instance be the parallel coordinate plot displayed on a graphical user interface so that the user of the electromechanical system can manipulate the data to generate the historical data.

In another embodiment the historical data is displayed as a contour plot or a heat map. This may be beneficial because it may help the user to identify trends in the historical data.

In another embodiment the historical data is displayed as a scatter plot. The use of a scatter plot may be beneficial because is may help a user to identify failure modes.

In another embodiment the machine monitor is configured to determine the current failure mode and the selected repair action from the historical data using any one of the following: cluster analysis, association analysis, a classification algorithm and combinations thereof.

In another embodiment the client system is configured for receiving a repair report after displaying the repair instructions. The repair report comprises a repair quality score. The machine monitor is configured for modifying the error reports in historical data using the repair quality score. This may be beneficial because if a repair was ineffective then the historical data can be modified so that this particular repair action is no longer emphasized. Likewise, if a particular repair action is particularly effective in repairing the machine it can be moved up in ranking so that this particular repair action is repeated more often.

In another embodiment the selected repair action is determined at least partially using any one of the following: data mining, pattern recognition and combinations thereof.

In another embodiment the client system is a battery-powered computing device.

In another embodiment the client system is a mobile telephone device that may be battery-powered.

In another aspect the invention provides for a machine monitor comprising a repair solution engine. The machine monitor comprises a memory containing processor instructions that implement the repair solution engine. The machine monitor comprises a processor for executing the processor instructions. Execution of the processor instructions causes the processor to receive the measurement data from the data transfer system. The data transfer system is configured for transferring the data from a machine to the machine monitor. The machine monitor comprises at least one mechanical component. The machine further comprises at least one electrical sensor for acquiring measurement data descriptive of the at least one mechanical component. The processor instructions further cause the processor to receive the historical data from a data logger.

The data logger is configured for logging the measurement data and error reports as historical data. The error reports are descriptive of one or more failure modes of the at least one mechanical component. The error reports are further descriptive of repair actions taken to repair the one or more failure modes. Execution of the processor instructions further causes the processor to search the historical data to determine a current failure mode and a selected repair action. The current failure mode is selected from the one or more failure modes of historical data. The selected repair action is selected from the repair actions.

Execution of the processor instructions further cause the processor to generate repair instructions using the selected repair action. Execution of the processor instructions further cause the processor to transfer the repair instructions of the selected repair entity to a client system. The client system may comprise a display.

In another aspect the invention provides for a method of repairing an electromechanical system. The electromechanical system comprises a machine. The machine comprises at least one mechanical component. The machine further comprises at least one electrical sensor for acquiring measurement data descriptive of the at least one mechanical component. The machine further comprises a data logger for logging the measurement data and error reports as historical data. The error reports are descriptive of one or more failure modes of the at least one mechanical component. The error reports are further descriptive of repair actions taken to repair the one or more failure modes. The electromechanical system further comprises a machine monitor comprising a repair solution engine. The machine monitor comprises a memory containing processor instructions that implement the repair solution engine. The electromechanical system further comprises a data transfer system for transferring the data from the machine to the machine monitor. The electromechanical system further comprises a client system wherein the client system comprises a display.

The method comprises the step of receiving the measurement data from the data transfer system. The method further comprises the step of receiving historical data from the data logger. The method further comprises the step of searching the historical data to determine a current failure mode and a selected repair action. The current failure mode is selected from the one or more failure modes of the historical data. The selected repair action is selected from the repair actions. The method further comprises the step of generating repair instructions using the selected repair action. The method further comprises the step of transferring the repair instructions of the selected repair entry to the client system. The method may also include displaying the repair instructions on the display of the client system after it has been transferred to the client system.

In another embodiment, the method further comprises repairing the at least one mechanical component according to the repair instructions.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
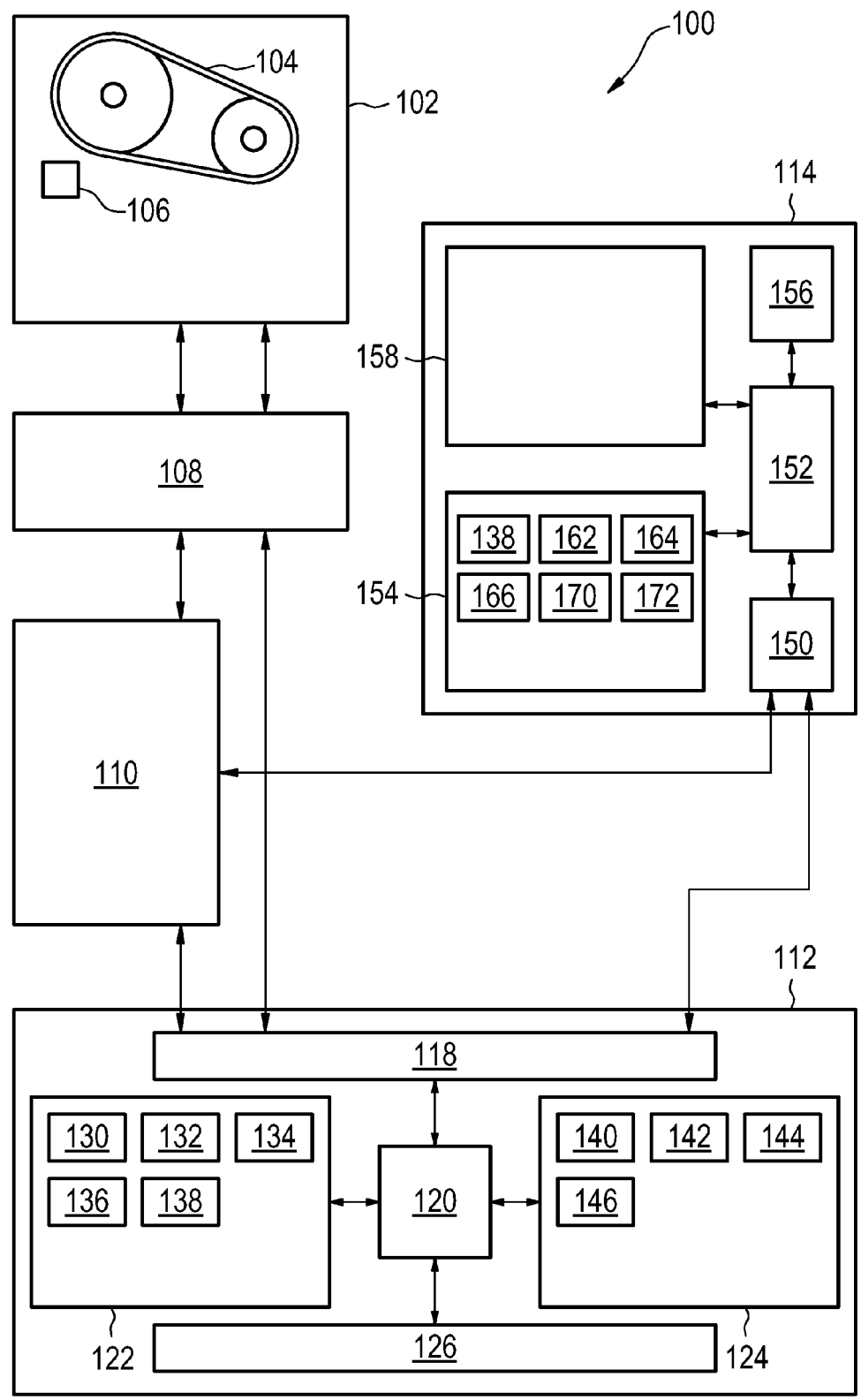
FIG. 1 illustrates and example of a electromechanical system.

FIG. 1 illustrates an example of an electromechanical system 100. The electromechanical system comprises a machine 102. The machine 102 has at least one mechanical component 104 and a sensor 106 for monitoring the mechanical component. The electromechanical system 100 further comprises a data transfer system 108, a data logger 110, a machine monitor 112 and a client system 114.

The data transfer system is shown as receiving data from the sensor 106. The data transfer system 108 is able to transfer data to the data logger 110 and/or the machine monitor 112. In some cases the data transfer system may also function as a data aggregator particularly in situations where the sensor 106 or sensors produce large volumes of data. The data aggregator may do such things as providing a statistical measure of the data from the sensor 106. For instance data may be averaged over a period of time and various statistical measures may be performed within that time period also such as a standard deviation or average or mean and other data reported. In some cases the data logger 110 may retrieve data directly from the machine 102. In many instances the data transfer system 108 will be located in the vicinity of the machine 102 and transfer the data to the data logger 110 and/or the machine monitor 112 via a network connection.

The data logger 110 logs measurement data and error reports as historical data. The error reports are descriptive of one or more failure modes of the at least one mechanical component. The error reports are further descriptive of repair actions taken to repair the one or more failure modes. In some instances the data logger may be an implementation of a database system. The data logger 110 is shown as being in communication with the network interface 118 of a machine monitor 112. In some other examples the data logger 110 and the machine monitor 112 may be implemented as within a single system or database system. For instance the machine monitor 112 may be implemented as a process that monitors the measurement data 130 and continually uses the database of the data logger 110 to monitor the condition of the at least one component 104 of the machine 102.

The machine monitor 112 is shown as having a processor that is in communication with the network interface 118. The processor 120 is further in communication with the computer storage 122, computer memory 124 and an optional user interface 126.

The computer storage 122 is shown as containing measurement data 130 that was received from the data transfer system 108. The computer storage 122 is further shown as containing historical data 132 that has been retrieved from the data logger 110. The computer storage 122 is further shown as containing a current failure mode 134. The computer storage 122 is further shown as containing a selected repair action 136. The computer storage 122 is further shown as containing repair instructions 138. The repair instructions 138 have been generated from the selected repair action 136. The selected repair action 136 was determined with the current failure mode 134 using the historical data 132 and comparing it to the measurement data 130.

The computer memory 124 is shown as containing a control module 140. The control module 140 contains computer executable code which enables the processor 120 to operate the machine monitor 112. The computer memory 124 further contains a query engine 142 for querying data from the data logger 110. The computer memory 124 is shown as further containing a data analysis module 144. The data analysis module 144 enables the processor 120 to analyze the historical data 132 and use the measurement data 130 to determine the current failure mode 134 and the selected repair action 136. The computer memory 124 is further shown as containing an instruction generation module 146 which enables the processor 120 to determine the repair instructions 138 from the selected repair action 136. The data analysis module 144 may function in different ways. For instance the data analysis module 144 may use data mining and/or pattern recognition to compare the historical data 132 with the measurement data 130.

The client system 114 is shown as having a network interface 150 that is able to connect to the data logger 110 and the network interface 118 of the machine monitor 112. In this example the client system 114 is able to analyze and modify the data in the data logger 110 and also to report the repair instructions 160. The client system 114 is shown as having a processor 152 that is in connection with a memory 154, the network interface 150, and a display 158. In some instances the display 158 is also a user interface. For example the display may be a touch screen display. In this example the client system 114 is shown as having a battery 156 which powers the client system. The network interface 150 for instance may be a transceiver or a digital cellular telephone network or it may be another type of network interface such as a Wi-Fi or Bluetooth which is used to connect to a hardwired interface in order to connect to the data logger 110 and the machine monitor 112.

The computer memory 154 is shown as containing repair instructions 138 that have been received from the machine monitor 112. The processor 152 may display the repair instructions 138 on the display 158. The computer memory 154 is further shown as containing additional historical data 162 that has been retrieved from the data logger 110. The additional historical data 162 may be displayed using a data display and analysis module 172. The memory 154 is further shown as containing a data display and analysis module 172 which enables the processor 152 to display the additional historical data 162 on the display 158. This analysis module also provides a user interface which enables the user to analyze the data and enter an error report 164 and/or a repair report 166 which are shown as being stored in the memory 154. The processor may then take the error report 164 and/or the repair report 166 and send it back for storage in the data logger 110. For instance if the data logger 110 is a database these may be entries which are made into the database system. The computer memory 154 is further shown as containing an additional control module 170. The control module 170 contains additional computer code or instructions which enable the processor 152 to control the operation and function of the client system 114.

Figure 2:
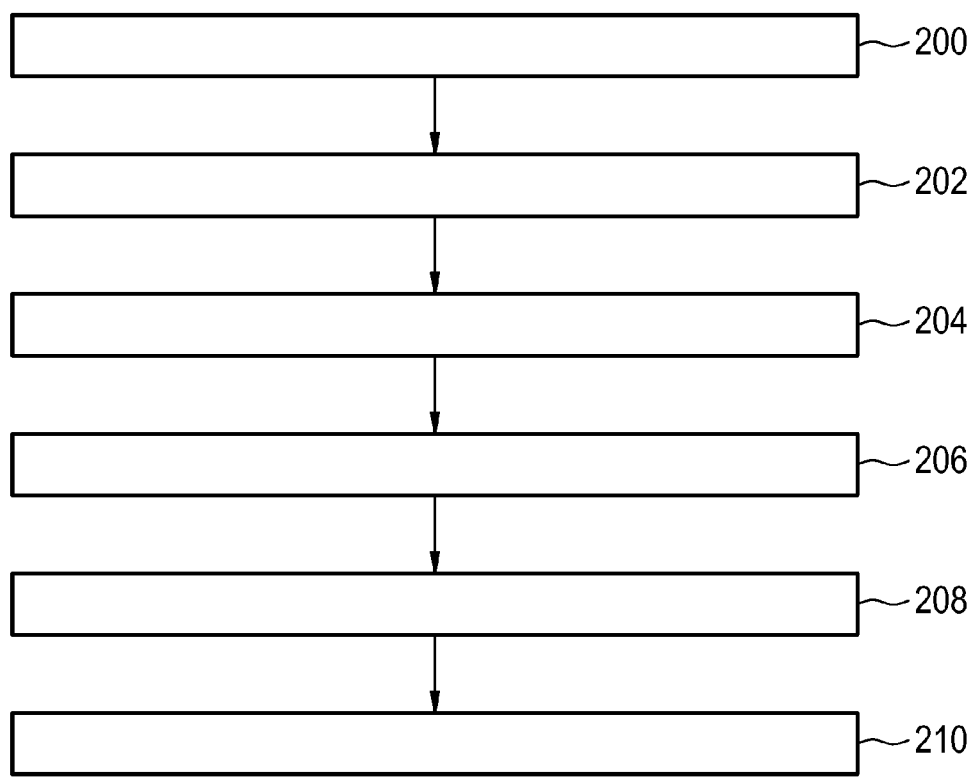
FIG. 2 shows a flow chart which illustrates a method of operating the electromechanical system.

FIG. 2 shows a flowchart which illustrates a method of operating the electromechanical system 100 of FIG. 1. First in step 200 the machine monitor receives the measurement data 130 from the data transfer system 108. Next in step 202 the machine monitor 112 receives the historical data 132 from the data logger 110. For instance the processor may generate a database query and receive the historical data 132 in response. Next in step 204 the processor 120 searches the historical data to determine a current failure mode 134 and a selected repair action 136. The current failure mode is selected from the one or more failure modes that are contained in the historical data 132. The selected repair action is selected from the repair actions. Next in step 206 the processor 120 generates repair instructions using the selected repair action 136. For instance the instruction generation module 146 may transform the selected repair action 136 into the form of the repair instructions 138. Next in step 208 the repair instructions 138 are transferred to the client system 114. The client system 114 may then display the repair instructions 136 on the display 158. Finally, step 210 is an optional step which may be performed by an operator of the electromechanical system. In step 210 the at least one mechanical component may be repaired by performing the repair instructions that are displayed on the display 158.

Figure 3:
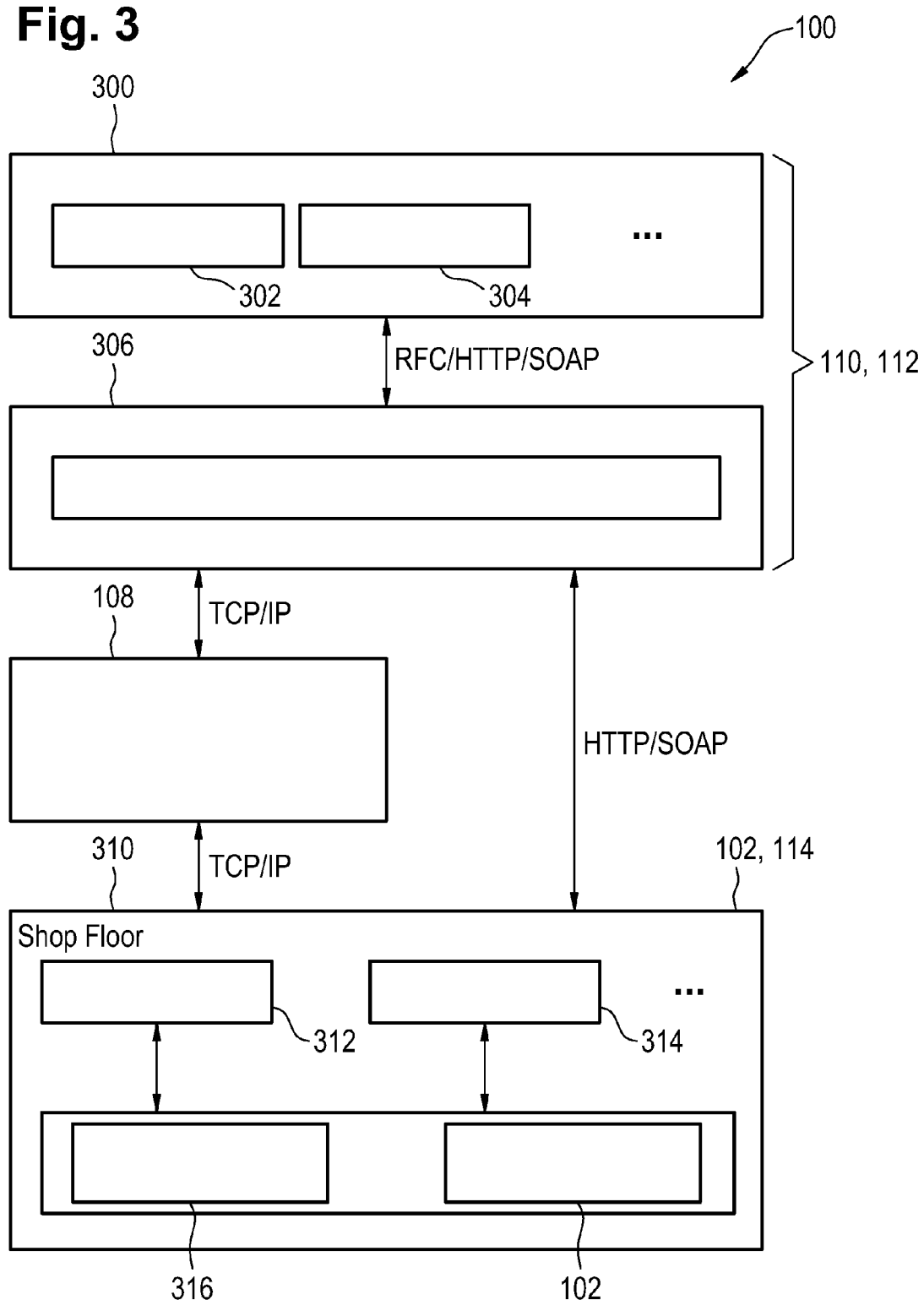
FIG. 3 illustrates a further example of an electromechanical system.

FIG. 3 shows one possible implementation of the electromechanical system 100 of FIG. 1. In this example the data logger 110 and machine monitor 112 are implemented as a database system 300 and a manufacturing integration and intelligence system 306. The database system 300 comprises an Enterprise Resource Planning (ERP) system 302 and a database 304. The data transfer 108 is shown in FIG. 1. The machine monitor 112 and the client system 114 are represented as a box representing the machines and systems that make up the shop floor 310 of a factory. There is a production surveillance system 312 and a production control system 314 that are in contact with the machine 102 and also a factory worker 316.

Figure 4:
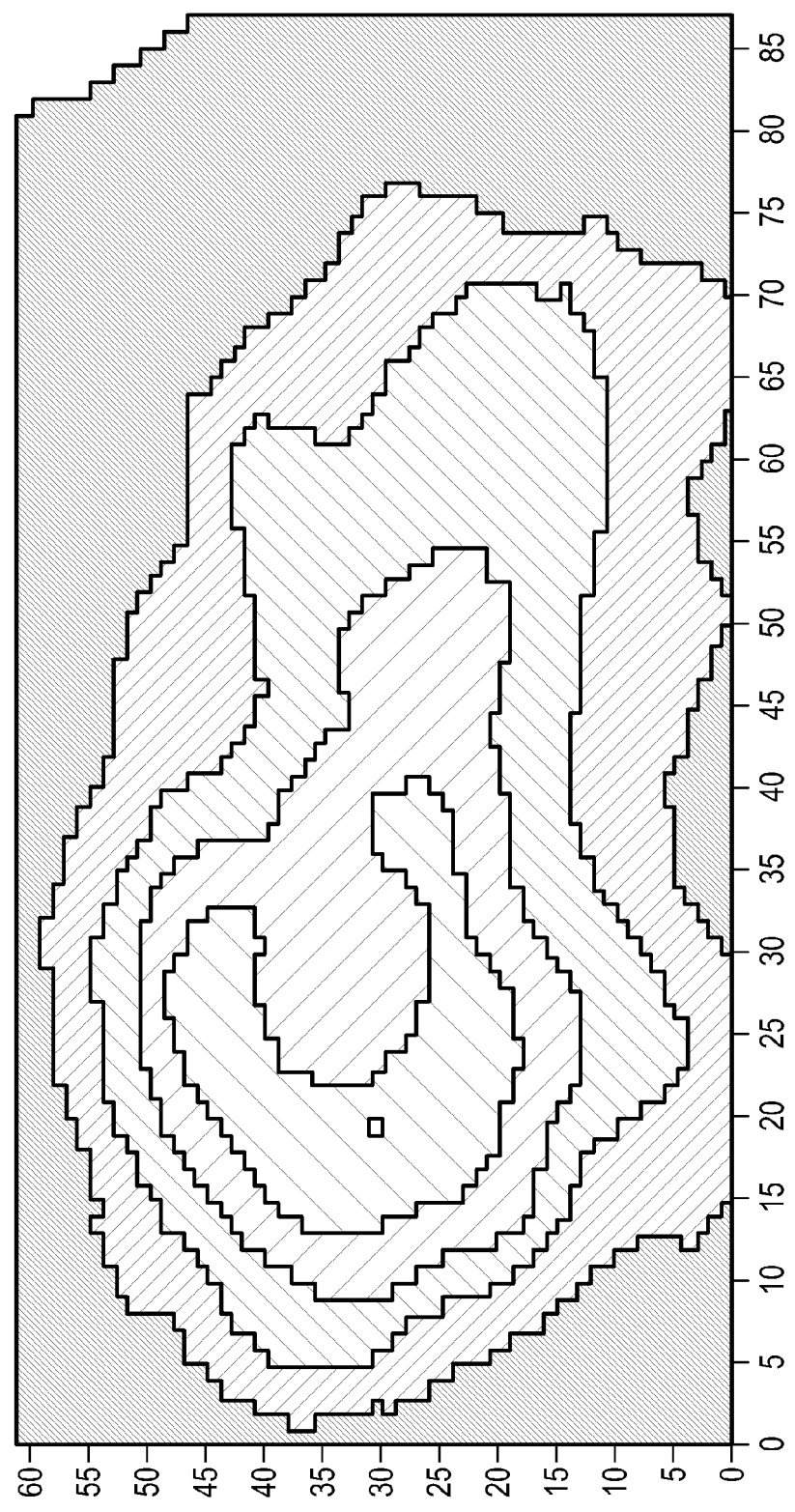
FIG. 4 illustrates an example of a heat map.

FIG. 4 displays a heat map which is one visual means that the historical data 132 can be displayed on the display 158 of FIG. 1. This may be useful for a worker 316 to identify a failure in the historical data which can be used later to detect a failure mode.

Figure 5:
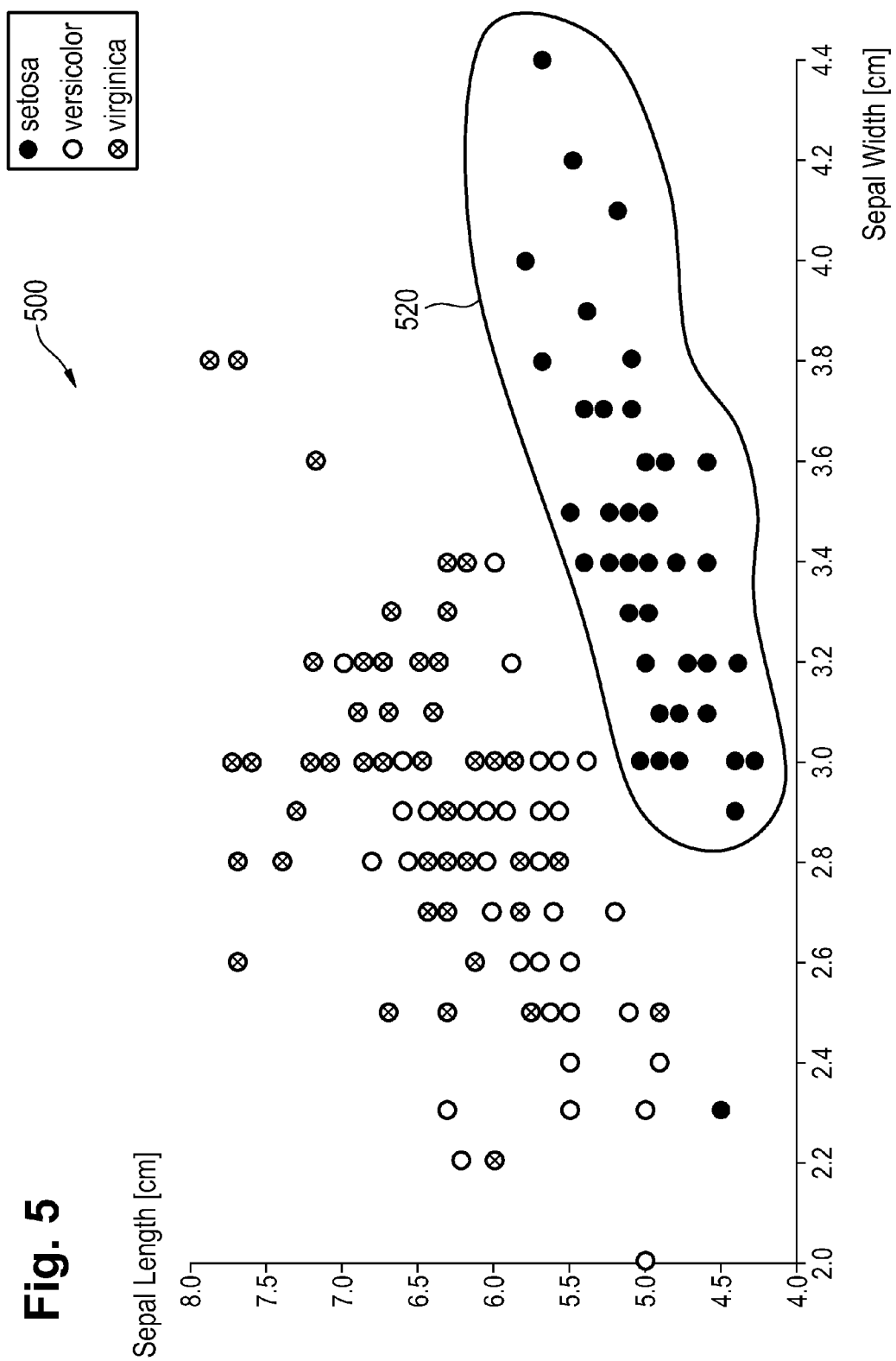
FIG. 5 illustrates an example of a scatter plot.

FIG. 5 shows an alternative way of analyzing the historical data. FIG. 5 shows a scatter plot. The scatter plot is labeled 500. The scatter plot may be useful in identifying groups of data. For instance the points surrounded by the circle 502 are readily identified as being separate data points from the other data points. For instance the worker 316 could mark on the display 158 a circle such as the circle shown in 502 to mark these data points for consideration or for modifying the historical data. Circling data 502 could also be used to exclude data from data points so that false results for determining a failure mode are not performed.

Figure 6:
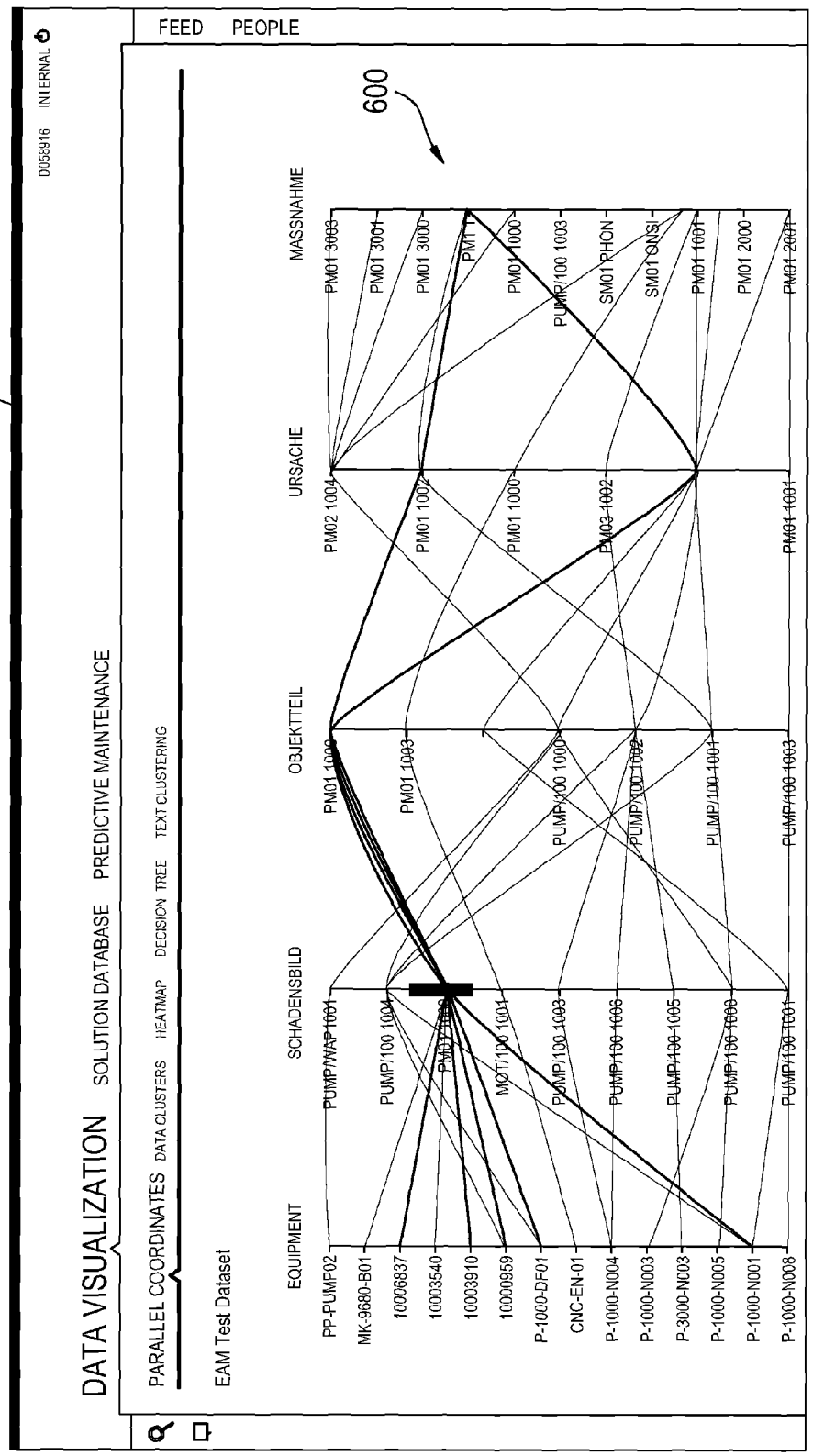
FIG. 6 illustrates an example of a parallel coordinate plot.

FIG. 6 shows an example of a parallel coordinate plot 600. This for instance may be displayed on the display 158. This may enable a worker 316 to more readily visualize the historical data.

Figure 7:
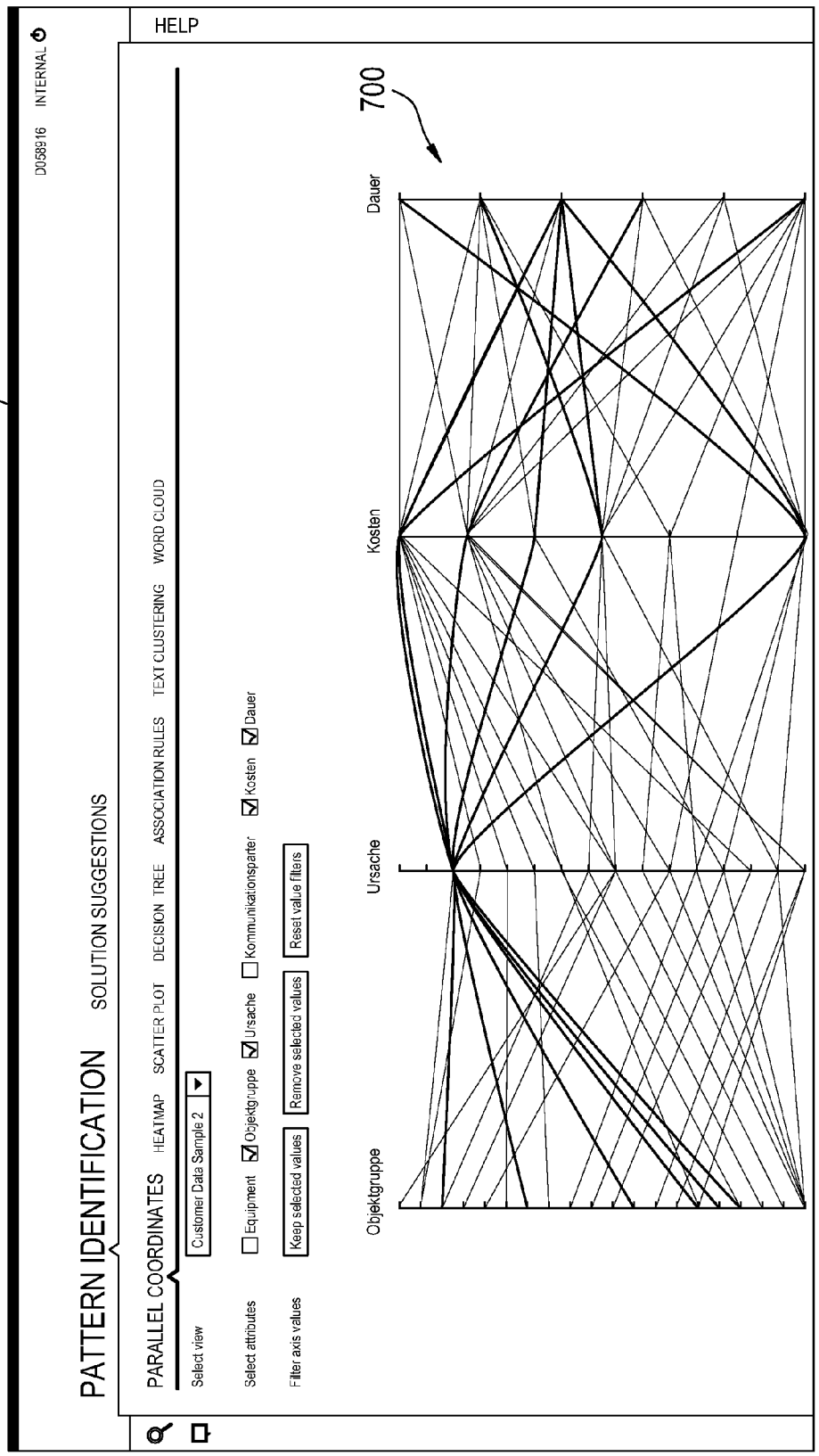
FIG. 7 illustrates a further example of a parallel coordinate plot.

FIG. 7 also on display 158 shows an alternative parallel coordinate plot 700. This parallel coordinate plot 700 shows different object groups, problems and costs and repair durations. This may enable the worker 316 to enter or determine a selected repair action. For instance the results of the analysis on the coordinate plot 700 could be stored for further use.

In producing the error reports there may be several ways of doing this. One way would be to use a text analysis system that analyzes the documents and produces the error reports and/or failure modes automatically. For instance a text analysis system could vet internal company documents which would include checklists and damage reports. Such a text analysis system could also look at handbooks and trade journals. Another possibility would be to implement a web crawler that looks at various websites and social media and also searches for comments regarding particular parts of the machinery or reports of failure of relevant equipment.

To search the historical data to determine a current failure mode there may be a number of different ways that may be used. One method would be to provide different methods for a user to analyze the historical data to come to a conclusion and report a failure mode. Another possibility would be to provide a module that performs cluster analysis. Other possibilities are also to perform associations analysis, standard classification or, as mentioned earlier, text mining of documents. When performing the classification the CART or C4.5 algorithm could be used. In performing text mining an example method would be to perform the steps of acquiring or collecting the documents, to put the documents into a standard form, to generate tokens from the standard format of the documents, to analyze the structure and the construction of the words from the tokens and then to generate vectors and then to operate the vectors for performing the analysis of the speech.

LIST OF REFERENCE NUMERALS 100 electromechanical system
102 machine
104 mechanical component
106 sensor
108 data transfer system (aggregator)
110 data logger
112 machine monitor
114 client system
118 network interface
120 processor
122 computer storage
124 computer memory
126 user interface
130 measurement data
132 historical data
134 current failure mode
136 selected repair action
138 repair instructions
140 control module
142 query engine
144 data analysis module
146 instruction generation module
150 network interface
152 processor
154 memory
156 battery
158 display and interface
162 additional historical data
164 error report 166 repair report
170 control module
172 data display and analysis module
300 database system
302 ERP system
304 database
306 manufacturing integration and intelligence
308 connections
310 shop floor
312 production surveillance system
314 production control system
316 factory worker
400 heatmap
500 scatter plot
502 group of data
600 parallel coordinate plot
700 parallel coordinate plot

The invention claimed is:

1. An electromechanical system comprising:
a machine, wherein the machine comprises at least one mechanical component, wherein the machine further comprises at least one electrical sensor for acquiring measurement data descriptive of the at least one mechanical component;
a data logger computer system for logging the measurement data and error reports as historical data, wherein the error reports are descriptive of one or more failure modes of the at least one mechanical component, wherein the error reports are further descriptive of repair actions taken to repair the one or more failure modes;
a machine monitor comprising a repair solution engine, wherein the machine monitor comprises:
 a memory containing processor instructions that implement the repair solution engine;
 a processor for executing the processor instructions;
 a network interface to a network;
a data transfer system for transferring the measurement data from the machine to the machine monitor via the network; and
a client computer system;
wherein execution of the processor instructions cause the processor to:
receive the measurement data from the data transfer system;
receive the historical data from the data logger computer system;
search the historical data to determine a current failure mode and a selected repair action, wherein the current failure mode is selected from the one or more failure modes of the historical data, wherein the selected repair action is selected from the repair actions;
generate repair instructions using the selected repair action; and
transfer the repair instructions of the selected repair action to the client computer system,
wherein the measurement data is transferred from the machine to the machine monitor without interposition of the client computer system, and wherein the error reports comprise text entered by a user at the client computer system and transferred from the client computer system to the data logger computer system, and wherein the data logger computer system is configured for at least partially collecting the error reports using a text mining module and one or more text documents.

2. The electromechanical system of claim 1, wherein the client computer system further comprises a user interface, wherein the data logger computer system is further configured for receiving the error reports at least partially from the user interface of the client computer system.

3. The electromechanical system of claim 2, wherein the client computer system comprises a display, wherein the client computer system is further configured for receiving the historical data from the data logger computer system, wherein the client computer system is further configured for displaying the historical data on the display, wherein the client computer system is further configured for receiving the error reports from the user interface in response to displaying the historical data, wherein displaying the historical data comprises displaying the measurement data of the historical data.

4. The electromechanical system of claim 3, wherein the measurement data is associated with the historical data and is displayed as a parallel coordinate plot.

5. The electromechanical system of claim 3, wherein the measurement data is associated with the historical data and is displayed as a contour plot or a heatmap.

6. The electromechanical system of claim 3, wherein the measurement data is associated with the historical data and is displayed as a scatter plot.

7. The electromechanical system of claim 1, wherein the machine monitor is configured to determine the current failure mode and the selected repair action from the historical data using any one of the following: cluster analysis, association analysis, a classification algorithm, and combinations thereof.

8. The electromechanical system of claim 1, wherein the client computer system comprises a display, wherein the client computer system is further configured for displaying the repair instructions on the display, wherein the client computer system is configured for receiving a repair report after displaying the repair instructions, wherein the repair report comprises a repair quality score, wherein the machine monitor is configured for modifying the error reports in the historical data using the repair quality score.

9. The electromechanical system of claim 1, wherein the selected repair action is determined at least partially using any one of the following: data mining, pattern recognition, and combinations thereof.

10. The electromechanical system of claim 1, wherein the client computer system is a battery powered computing device.

11. A system for monitoring a machine, wherein the machine comprises at least one mechanical component and at least one electrical sensor for acquiring measurement data descriptive of the at least one mechanical component, the system comprising:
a machine monitor comprising a repair solution engine, wherein the machine monitor comprises a memory containing processor instructions that implement the repair solution engine, wherein the machine monitor comprises a processor for executing the processor instructions;
a data transfer system configured to:
 receive the measurement data from the machine;
 aggregate the measurement data to provide aggregated measurement data; and
 transfer the aggregated measurement data to the machine monitor;
wherein execution of the processor instructions cause the processor of the machine monitor to:
receive the aggregated measurement data from the data transfer system;

receive historical data from a data logger computer system, wherein the data logger computer system is configured for logging the aggregated measurement data and error reports as historical data, wherein the error reports are descriptive of one or more failure modes of the at least one mechanical component, wherein the error reports are further descriptive of repair actions taken to repair the one or more failure modes;

search the historical data to determine a current failure mode and a selected repair action, wherein the current failure mode is selected from the one or more failure modes of the historical data, wherein the selected repair action is selected from the repair actions;

generate repair instructions using the selected repair action; and transfer the repair instructions of the selected repair action to a client computer system, wherein the aggregated measurement data is transferred to the machine monitor without interposition of the client computer system, and wherein the error reports comprise text entered by a user at the client computer system and transferred from the client computer system to the data logger computer system, and wherein the data logger computer system is configured for at least partially collecting the error reports using a text mining module and one or more text documents.

12. A non-transitory computer-readable storage medium containing machine executable instructions for implementing a repair solution engine, wherein execution of the machine executable instructions cause a processor to:

receive measurement data from a data transfer system, wherein the data transfer system is configured for transferring the measurement data from a machine to a machine monitor, wherein the machine comprises at least one mechanical component, wherein the machine further comprises at least one electrical sensor for acquiring measurement data descriptive of the at least one mechanical component;

receive historical data from a data logger computer system, wherein the data logger computer system is configured for logging the measurement data and error reports as historical data, wherein the error reports are descriptive of one or more failure modes of the at least one mechanical component, wherein the error reports are further descriptive of repair actions taken to repair the one or more failure modes;

search the historical data to determine a current failure mode and a selected repair action, wherein the current failure mode is selected from the one or more failure modes of the historical data, wherein the selected repair action is selected from the repair actions;

generate repair instructions using the selected repair action; and transfer the repair instructions of the selected repair action to a client computer system, wherein the measurement data is received from the data transfer system without interposition of the client computer system, and wherein the error reports comprise text entered by a user at the client computer system and transferred from the client computer system to the data logger computer system, and wherein the data logger computer system is configured for at least partially collecting the error reports using a text mining module and one or more text documents.

13. A method of repairing an electromechanical system, wherein the electromechanical system comprises:

a machine, wherein the machine comprises at least one mechanical component, wherein the machine further comprises at least one electrical sensor for acquiring measurement data descriptive of the at least one mechanical component;

a machine monitor comprising a repair solution engine, wherein the machine monitor comprises a memory containing processor instructions that implement the repair solution engine;

a data transfer system configured to receive the measurement data from the machine, aggregate the measurement data to provided aggregated measurement data and transfer the aggregated measurement data to the machine monitor;

a data logger computer system for logging the aggregated measurement data and error reports as historical data, wherein the error reports are descriptive of one or more failure modes of the at least one mechanical component, wherein the error reports are further descriptive of repair actions taken to repair the one or more failure modes; and a client computer system;

wherein the method comprises:

receiving the aggregated measurement data from the data transfer system;

receiving the historical data from the data logger computer system;

searching the historical data to determine a current failure mode and a selected repair action, wherein the current failure mode is selected from the one or more failure modes of the historical data, wherein the selected repair action is selected from the repair actions;

generating repair instructions using the selected repair action; and transferring the repair instructions of the selected repair action to the client computer system, wherein the aggregated measurement data is received from the data transfer system without interposition of the client computer system;

the method further comprising:

receiving, the data logger computer system, the error reports at least partially from a user interface of the client computer system, wherein the error reports comprise text entered by a user at the client computer system; and collecting, by the data logger computer system, the error reports at least partially using a text mining module and one or more text documents.

14. The method of claim 13, wherein the client computer system comprises a display, wherein the method further comprises displaying the repair instructions on the display, wherein the method further comprises repairing the at least one mechanical component according to the repair instructions.

15. The method of claim 13, wherein the client computer system comprises a display, wherein the method further comprises the client computer system:

receiving the historical data from the data logger computer system;

displaying at least the aggregated measurement data of the historical data on the display; and receiving the error report from the user interface in response to displaying at least the aggregated measurement data of the historical data.

16. The method of claim 15, wherein the method further comprises displaying the aggregated measurement data as any one of the following: a parallel coordinate plot, a contour plot, a heatmap, and a scatterplot.

17. The method of claim 13, wherein the method further comprises the machine monitor determining the current failure mode and the selected repair action from the historical data using any one of the following: cluster analysis, association analysis, a classification algorithm, and combinations thereof.

* * * * *